US011328339B2

(12) United States Patent
Penner et al.

(10) Patent No.: US 11,328,339 B2
(45) Date of Patent: *May 10, 2022

(54) SYSTEM AND METHOD FOR FASHION RECOMMENDATIONS

(71) Applicant: Color Butler, Inc., Chula Vista, CA (US)

(72) Inventors: Robert Penner, Chula Vista, CA (US); David Fogel, La Jolla, CA (US); Gary Fogel, San Diego, CA (US); Yuval Shenkal, San Diego, CA (US); James Vaccaro, San Diego, CA (US); Christine Woodward, Chula Vista, CA (US)

(73) Assignee: Color Butler, Inc., Chula Vista, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/499,106

(22) Filed: Oct. 12, 2021

(65) Prior Publication Data

US 2022/0101408 A1    Mar. 31, 2022

Related U.S. Application Data

(60) Continuation-in-part of application No. 17/174,031, filed on Feb. 11, 2021, now Pat. No. 11,157,988, (Continued)

(51) Int. Cl.
*G06Q 30/00* (2012.01)
*G06Q 30/06* (2012.01)
*G06N 20/00* (2019.01)

(52) U.S. Cl.
CPC ........ *G06Q 30/0631* (2013.01); *G06N 20/00* (2019.01); *G06Q 30/0643* (2013.01)

(58) Field of Classification Search
CPC ...................................................... G06N 20/00
(Continued)

(56) References Cited

U.S. PATENT DOCUMENTS

| | | |
|---|---|---|
| 6,424,370 B1 | 7/2002 | Courtney |
| 7,617,016 B2 | 11/2009 | Wannier et al. |

(Continued)

OTHER PUBLICATIONS

NewsRX: "Computerized Device, System, and Method for Coordinating an Outfit" in Patent Application Approval Process Marketing Weekly News [Atlanta] Jul. 25, 2015: 178. Dialog #1696695159; 8pgs. (Year: 2105).

*Primary Examiner* — Robert M Pond
(74) *Attorney, Agent, or Firm* — Lewis Kohn & Walker LLP; David M. Kohn

(57) ABSTRACT

Novel system, methods, which include machine learning, and device for providing color and fashion recommendations, including for persons with visual impairment such as color blindness or complete blindness. Also, methods providing a data storage system for storing digital renditions of garments; providing a portable communication device to extract color and/or pattern from garments through use of a camera and at least one algorithm; providing a processor capable of accessing locally stored and/or remote information about or learning the preferred matching set of garments; assigning each garment in the set of garments a red-green-blue (RGB) value; providing a suitability ranking for matching compatibility of the garment or the set of garments; and providing recommendations for preferred matching garment or set of garments by organizing the garments in at least one queue selected from the group consisting of audial, tactile, visual or a combination thereof, wherein the individual imports garments or set of garments, through a series of photos or video, for bulk import into a (Continued)

virtual closet for the identification and assignment of type of garments or set of garments using human or computational methods.

38 Claims, 8 Drawing Sheets

Related U.S. Application Data which is a continuation-in-part of application No. 16/842,247, filed on Apr. 7, 2020, now Pat. No. 10,963,944, which is a division of application No. 15/826,245, filed on Nov. 29, 2017, now Pat. No. 10,614,506.

(60) Provisional application No. 62/451,592, filed on Jan. 27, 2017.
(58) Field of Classification Search
USPC .................................................. 705/26, 27
See application file for complete search history.

(56) References Cited

U.S. PATENT DOCUMENTS

| | | | |
|---|---|---|---|
| 8,103,551 B2 | 1/2012 | Saul et al. | |
| 8,249,941 B2 | 8/2012 | Saul et al. | |
| 8,682,738 B2 | 3/2014 | Ivanov | |
| 9,070,171 B2 | 6/2015 | Guo | |
| 10,614,506 B2 * | 4/2020 | Penner | G06N 5/04 |
| 10,963,944 B2 * | 3/2021 | Penner | G06Q 30/0643 |
| 11,157,988 B2 * | 10/2021 | Penner | G06Q 30/0269 |
| 2005/0075145 A1 | 4/2005 | Dvorak | |
| 2008/0126962 A1 | 5/2008 | Cook | |
| 2008/0294528 A1 | 11/2008 | Denk, Jr | |
| 2010/0191770 A1 | 7/2010 | Cho | |
| 2011/0082764 A1 | 4/2011 | Flusser | |
| 2015/0186965 A1 | 7/2015 | Paul | |
| 2016/0026926 A1 | 1/2016 | Yeung | |
| 2017/0011452 A1 | 1/2017 | Beckham | |
| 2017/0076011 A1 | 3/2017 | Gannon | |
| 2017/0277365 A1 | 9/2017 | Gaidar | |
| 2017/0365011 A1 | 12/2017 | McIlroy | |
| 2021/0004589 A1 | 1/2021 | Turkelson | |
| 2021/0133160 A1 | 5/2021 | Craft | |

* cited by examiner

SYSTEM AND METHOD FOR FASHION RECOMMENDATIONS

RELATED APPLICATIONS

This application is a continuation-in-part application based on U.S. patent application Ser. No. 17/174,031 filed Feb. 11, 2021, which is a continuation-in-part application of U.S. patent application Ser. No. 16/842,247 filed Apr. 7, 2020, now U.S. Pat. No. 10,963,944, which is a divisional application of U.S. patent application Ser. No. 15/826,245 filed Nov. 29, 2017, now U.S. Pat. No. 10,614,506, which claims the benefit of priority from U.S. Provisional Patent Application No. 62/451,592 filed Jan. 27, 2017, the entire contents of which are herein incorporated by reference.

FIELD OF THE INVENTION

The present invention provides a novel system, methods, which include machine learning, and device for providing color and fashion recommendations, including for persons with visual impairment such as color blindness or complete blindness. Many online or application-based fashion systems provide personal image content that allow users to select and evaluate combinations of clothes by eye. Some of these systems include outside human expert guidance as to what is or is not fashionable. A present challenge is to assist color blind or blind people, or people with little to no fashion sense, with a system, methods, and device that provides the ability to evaluate clothing options from their closet, other people's closets, retailers, or elsewhere, record and plan clothing sets for future engagements, and receive audio, video, or other means of feedback about the appropriateness of those selections. The present invention addresses these challenges to help evaluate and recommend color and fashion solutions.

BACKGROUND OF THE INVENTION

For both men and women, fashion styles, as well as the clothing items includes in such styles, may be very difficult to distinguish and discern. It can be even more so for certain individuals having specific eye conditions, such as color blindness.

It is known in the relevant art that attempts to solve such a problem related to selection based on fashion choices exist. For example, U.S. Pat. No. 8,249,941 describes methods for selecting fashion items, pairing with additional fashion items, as associated with a style matrix. However, this is a system based on a static fashion style matrix with set attributes, as opposed to accessing any other type of variable (such as opinions of fashion experts, etc.). Further, there is no association with actual clothing items within a user's wardrobe.

U.S. Pat. No. 8,103,551 discloses methods using a mathematical function to ascertain any similarities between article attributes and compares to a threshold in order to determine if such attributes are sufficiently similar. While such methods are helpful in comparing articles of clothing in order to recognize associations across different types of articles, there is no ability to incorporate other variables into methodology to include more practical items, such as digital versions of an actual user's clothes in their closet, or inclusion of expert recommendations for subsequent matching of clothing or real-time access to purchase such outfits.

Thus, there still exists a need in the art to help evaluate and recommend color and fashion solutions on a device suitable for a user in need thereof.

SUMMARY OF THE INVENTION

This invention provides a system, methods, and device for optimizing color and fashion decisions for visually impaired and other people. The invention allows the human user to more competently choose clothing sets in relation to season, weather, or other environment. The system, methods, and device also provides the opportunity to learn about useful recommendations from the data collected through a social network of other human users, coupled with knowledge about apparel manufacturers and their available garments and costs.

In one aspect, the present invention provides a system of selecting a preferred matching set of garments to assemble an outfit, comprising: a device further comprising a data storage system for storing the set of garments, wherein the set of garments further comprises colors and/or patterns as inputted into the device by a user, wherein the set of garments is scored by the device.

In another aspect, the present invention describes a method of selecting a preferred matching set of garments to assemble an outfit for an individual, the method comprising: providing a data storage system for storing digital renditions of garments or accessories, providing a processor capable of accessing locally stored and/or remote information about or learning the preferred matching set of garments.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

REFERENCE NUMERALS IN DRAWINGS

Figure 1:
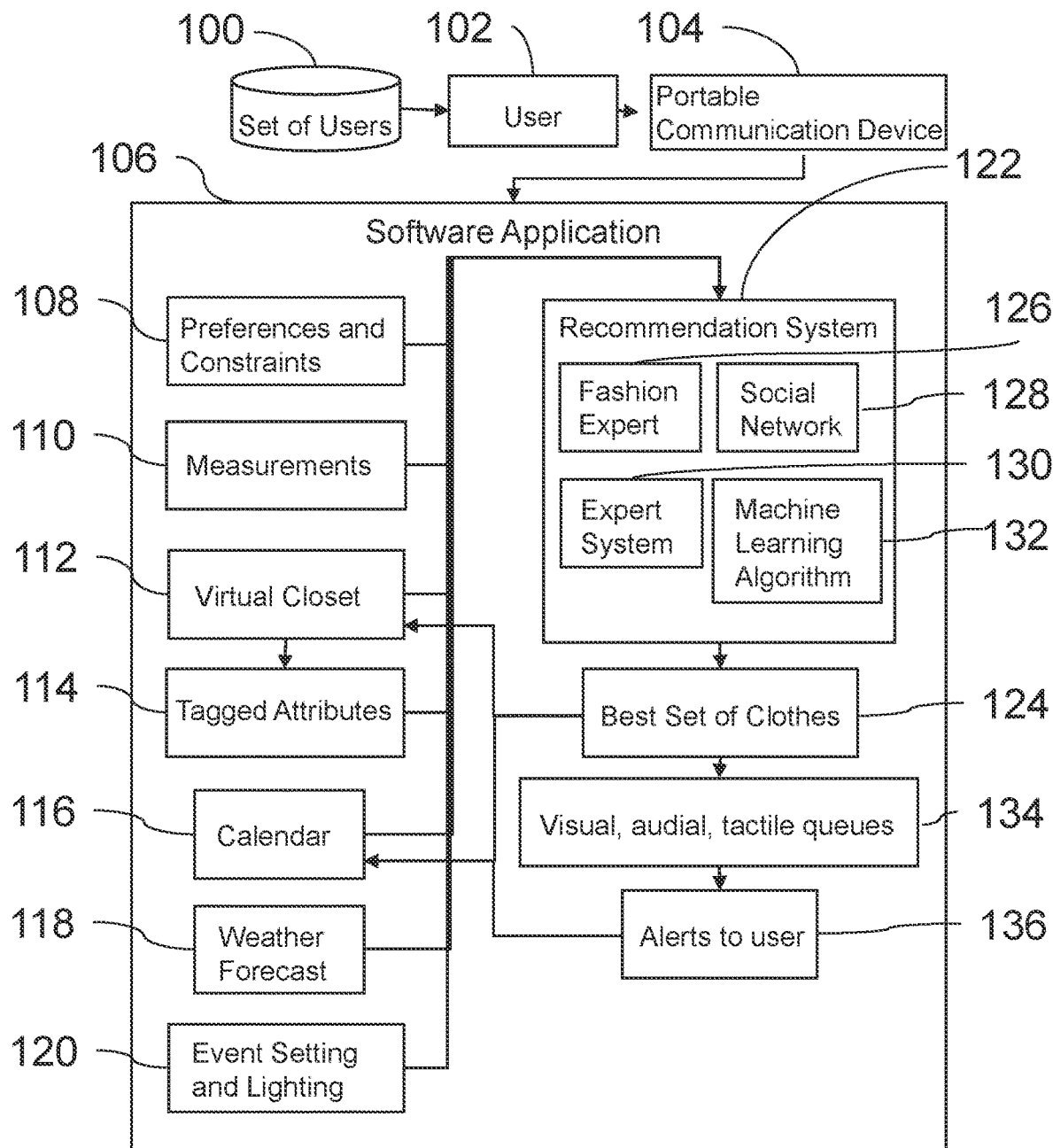
FIG. 1 depicts a block diagram of the system, methods, and device for providing fashions recommendations to users.

Reference Numerals in FIG. 1

100 Set of users
102 User

Figure 2:
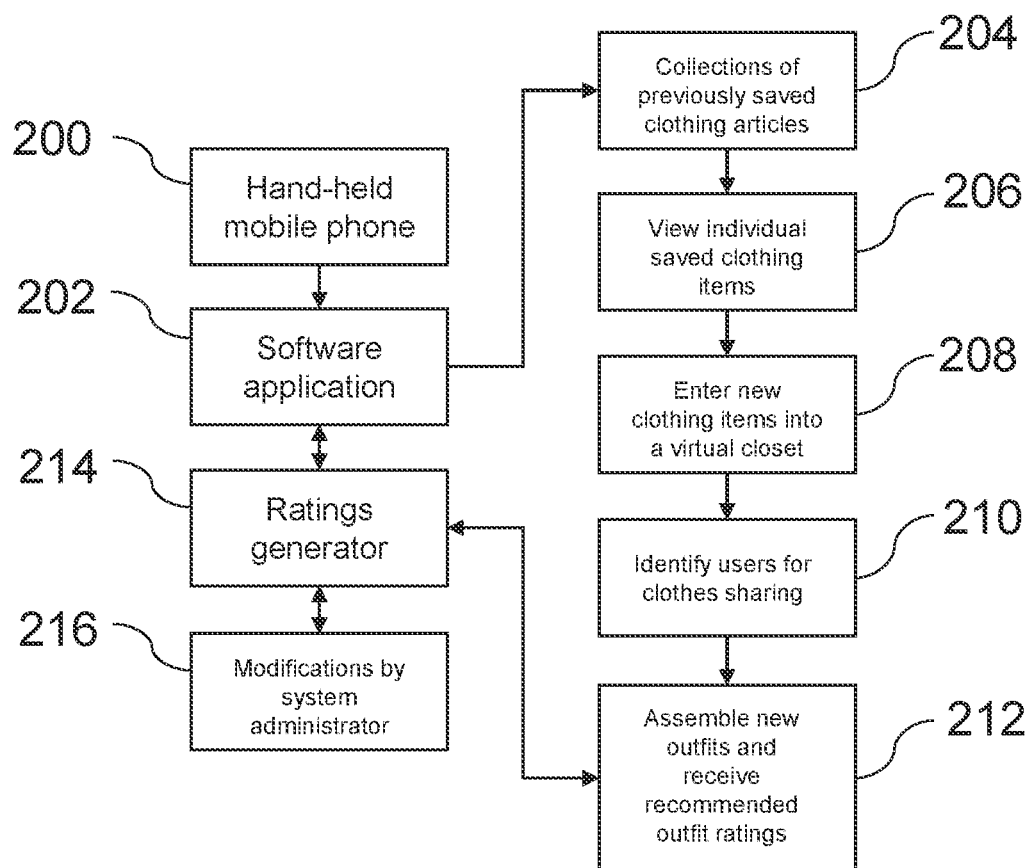
FIG. 2 depicts a block diagram of the system and methods for the input and use of clothing items within the device.

104 Portable communication device
106 Software application
108 Preferences and constraints
110 Measurements
112 Virtual closet
114 Tagged attributes
116 Calendar
118 Forecasted weather
120 Event setting and lighting
122 Recommendation system
124 Best set of clothes
126 Fashion expert
128 Social network
130 Expert system
132 Machine learning algorithm
134 Visual, audial, tactile queues
136 Alerts to user Reference Numerals in FIG. 2

Figure 3:
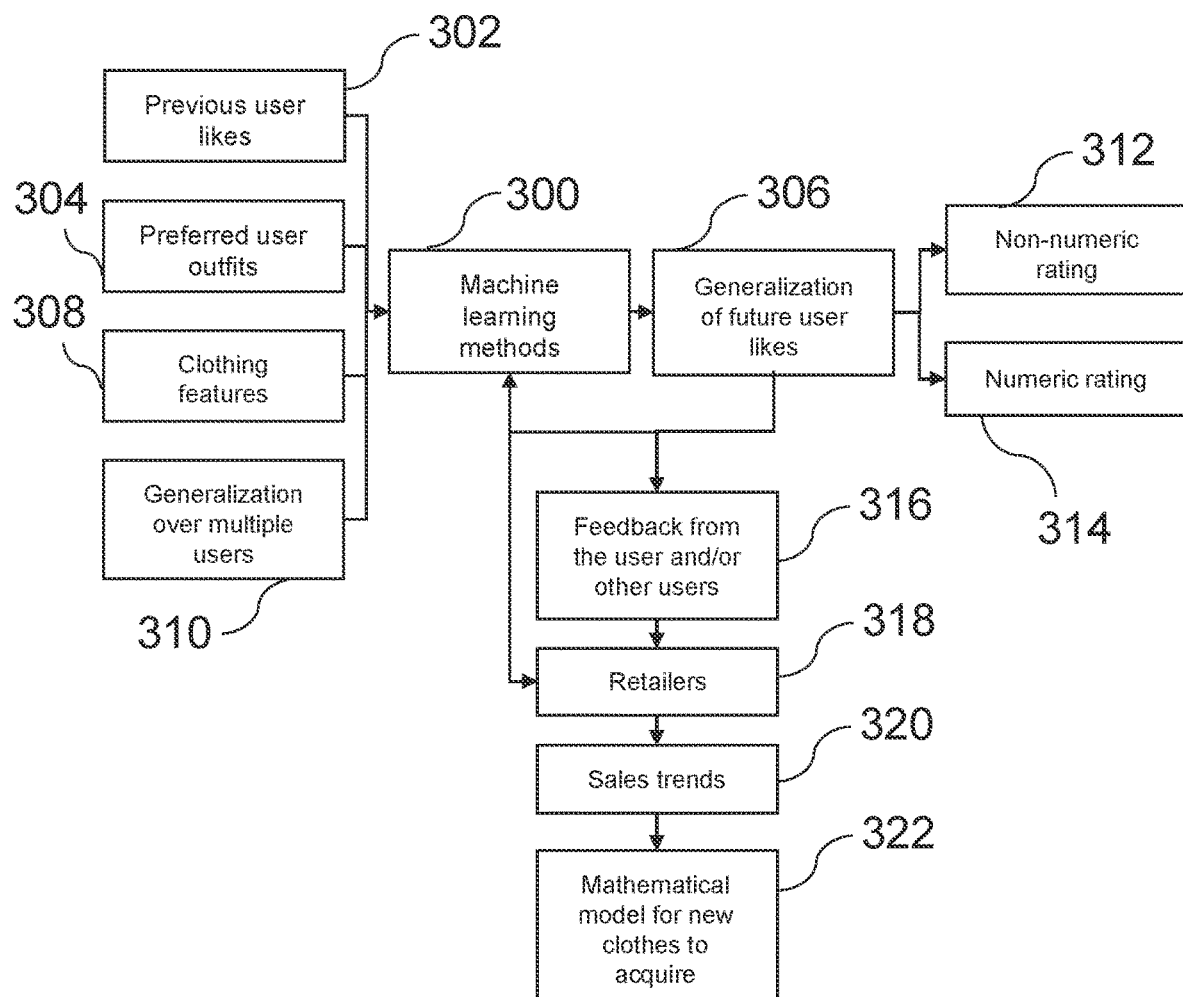
FIG. 3 depicts a block diagram of the system and methods for use of scoring and providing scores for clothing sets and providing information back to retailers within the device.

200 Hand-held mobile phone
202 Software application
204 Collections of previously saved clothing articles
206 View individual saved clothing items
208 Enter new clothing items into a virtual closet
210 Identify users for clothes sharing
212 Assemble new outfits and receive recommended outfit ratings
214 Ratings generator
216 Modifications by system administrator Reference Numerals in FIG. 3

Figure 4:
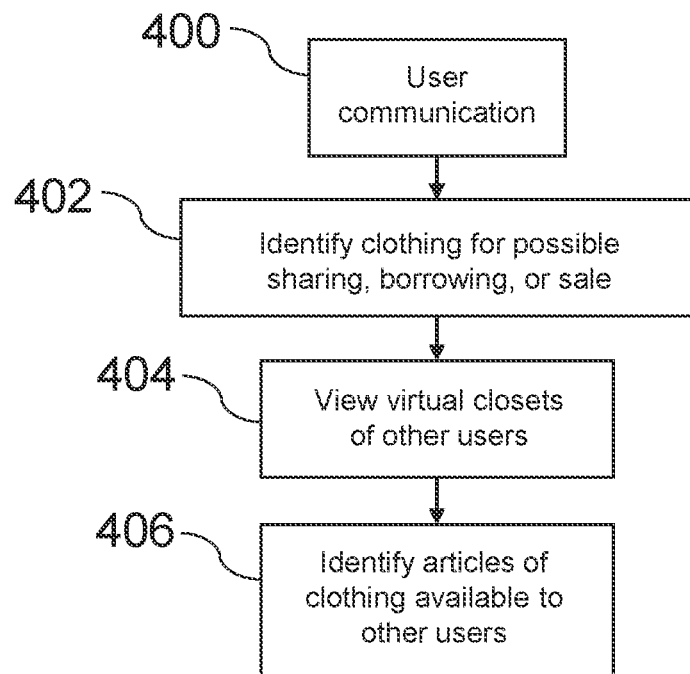
FIG. 4 depicts a block diagram of the system and methods allowing for user-to-user communication and sharing of closets and clothes through the device.

300 Machine learning methods
302 Previous user likes
304 Preferred user outfits
306 Generalization of future user likes
308 Clothing features
310 Generalization over multiple users
312 Numeric rating
314 Non-numeric rating
316 Feedback from the user and/or other users
318 Retailers
320 Sales trends
322 Mathematical model for new clothes to acquire Reference Numerals in FIG. 4

Figure 5:
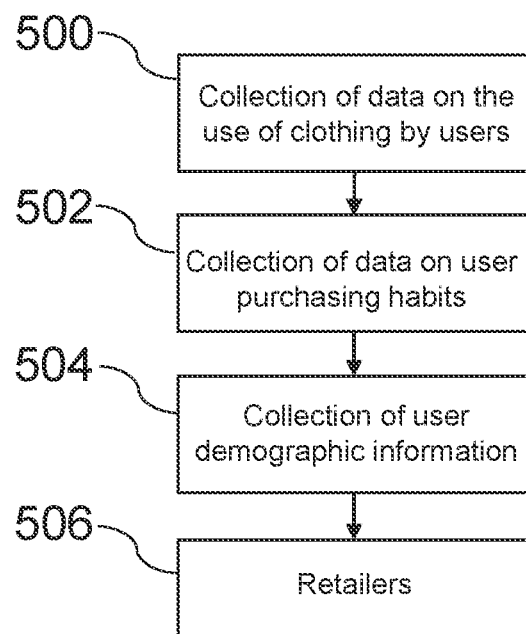
FIG. 5 depicts a block diagram of the system and methods for the collection of data by type and their utility to retailers within the device.

400 User communication
402 Identify clothing for possible sharing, borrowing, or sale
404 View virtual closets of other users
406 Identify articles of clothing available to other users Reference Numerals in FIG. 5

Figure 6:
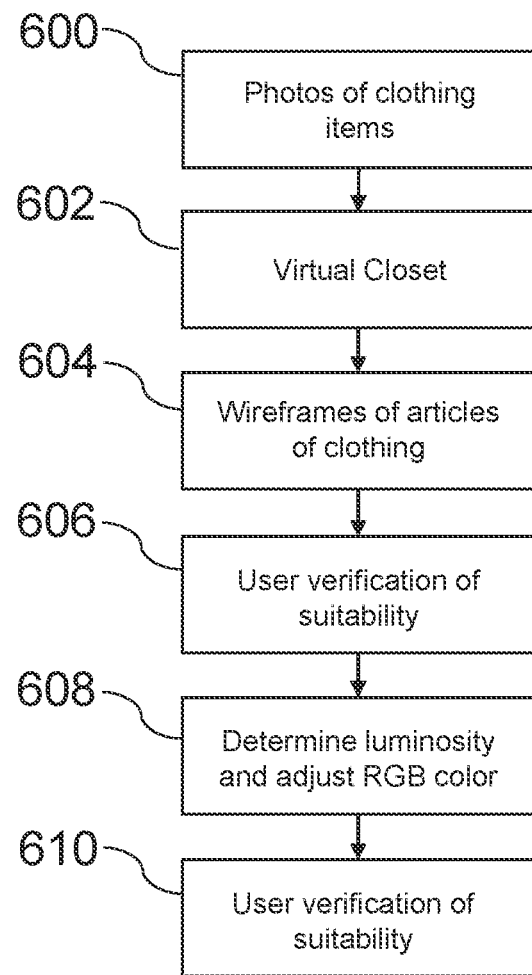
FIG. 6 depicts a block diagram of the system and methods of populating virtual closets using various means with the device.

500 Collection of data on the use of clothing by users
502 Collection of data on user purchasing habits
504 Collection of user demographic information
506 Retailers Reference Numerals in FIG. 6

Figure 7:
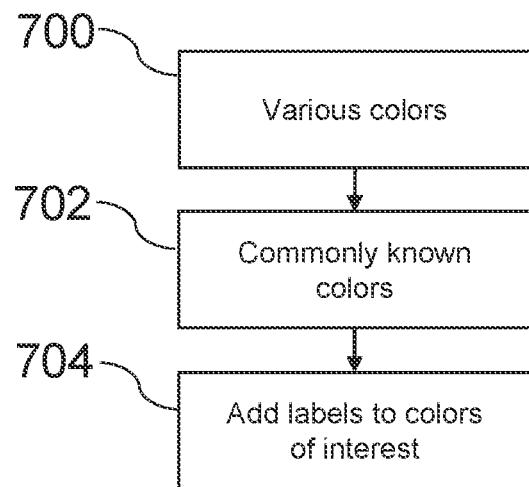
FIG. 7 depicts a block diagram of the system and methods allowing the assignment of proper labels to colors in the device.

600 Photos of clothing items
602 Virtual closet
604 Wireframes of articles of clothing
606 User verification of suitability
608 Determine luminosity and adjust RGB color
610 Photo with current light setting as reference Reference Numerals in FIG. 7

Figure 8:
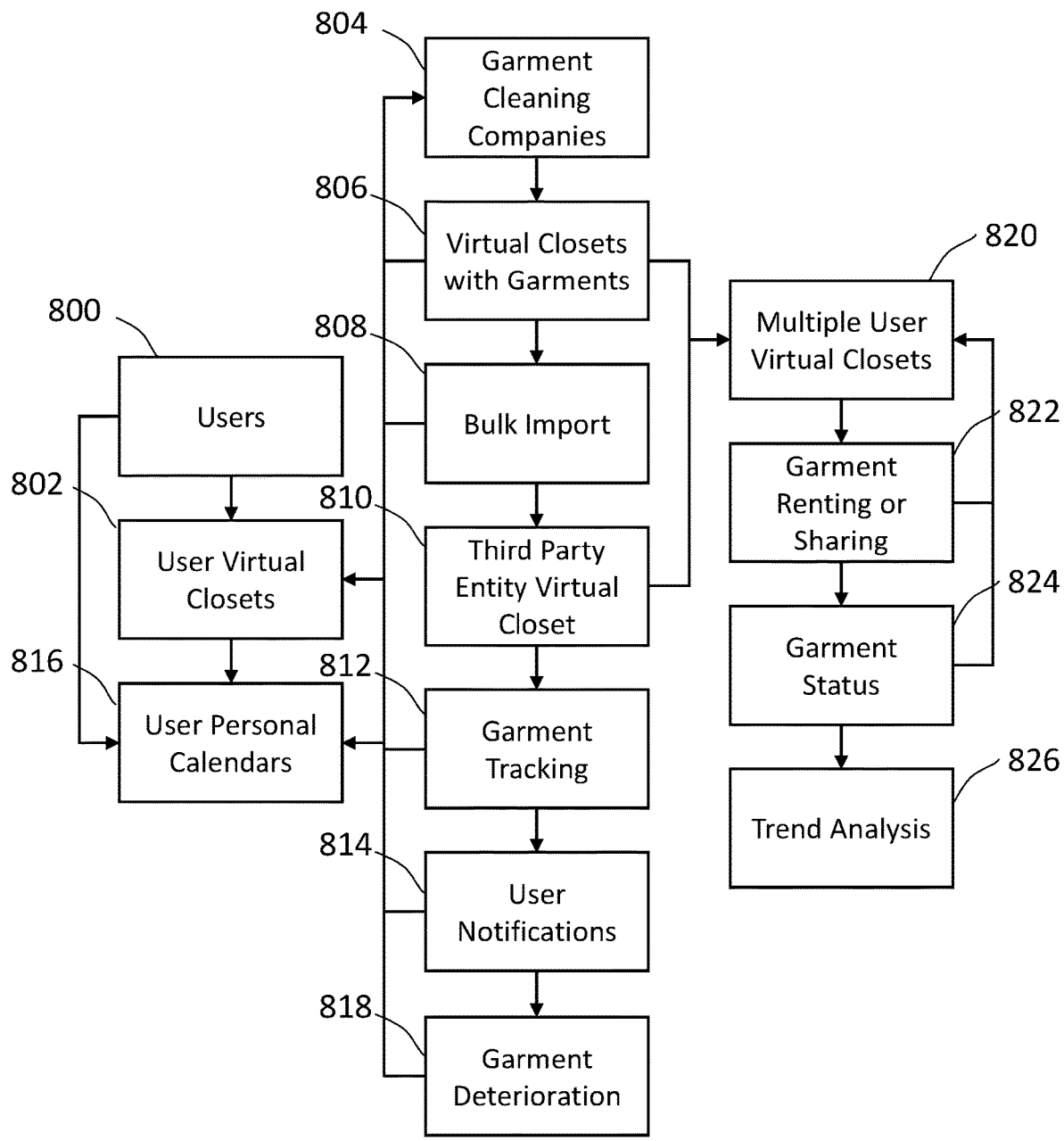
FIG. 8 depicts a block diagram of the system and methods for use by third party entities, including garment cleaning companies.

700 Various colors
702 Commonly known colors
704 Add labels to colors of interest Reference Numerals in FIG. 8

800 Users
802 User virtual closet
804 Garment cleaning companies
806 Virtual closets with garments
808 Bulk import
810 Third party entity virtual closet
812 Garment tracking
814 User notifications
816 User personal calendar
818 Garment deterioration
820 Multiple user virtual closets
822 Garment renting or sharing
824 Garment status
826 Trend analysis

DETAILED DESCRIPTION OF THE INVENTION

A preferred embodiment of the present invention is illustrated in FIG. 1.

A set of users 100 use the color and/or fashion recommendation system. A user 102 interacts with the recommendation system using a computing device 104, most typically a hand-held phone. Residing on the phone is a software application 106 that is the basis of the recommendation system. The user inputs color and/or fashion preferences and constraints 108, measurements 110, and generates a virtual closet of their garments, potentially including accessories 112, where each garment or accessory is associated with tagged attributes 114. A calendar 116 is used by the user to define current and future events, their type, and garment need relative to expected weather forecast 118, if known, and event setting and lighting 120. Within the device, a recommendation system 122 uses one or a set of approaches, to generate a suggested set of clothes 124 for each event on the user's calendar 116. These approaches include the advice of a human fashion expert 126, advice and/or choices of a social network of other users of the device and system 128, computer rule-based and/or case-based expert system 130, and/or machine learning algorithm 132. The suggested set of clothes is offered to the user using visual, audial, and/or tactile queues 134 where the user can approve or reject the recommendations. The user can iteratively use the system to find increasingly appropriate sets of clothes. The user-selected set of clothes is then automatically linked to the calendar, and the system provides alerts to the user 136 as to which sets to wear on which future dates and which garments might be required to be picked up from the cleaners so that they are available in advance of specific events. The overall flow of the recommendation system, methods, and device allows for the rapid, interactive, selection of appropriate garments and/or accessories with human assistance or using machine learning methods, and in a manner that can be compatible with colorblind or blind users as well those who are non-visually impaired.

A user 102 from a set of users 100 makes use of a computing device 104 such as a hand-held phone, tablet, personal computer, or personal data assistant to interface with the software application 106 of interest. The user establishes color and/or fashion preferences and constraints 108 that include, for example location, geocultural predisposition, personal measurements including body type, age, complexion, gender, hair color, style, season, retailer, alerts, and the ability to link to other users of the software application. The choice of gender in the preferences may cause changes to the manner in which information is presented in the software application to the end user. The user establishes measurements 110 for their size, shape, complexion, features and any other defining elements. These defining elements can also include qualitative or quantitative measures of the way in which clothing and accessories fit on the user given the user's shape and size may change with time. These features and constraints may be used by the system, methods, and device to help the user review and score clothing sets that are considered appropriate or best. For example, the system can help the user determine which clothes are best on an international trip where the chosen sets of clothes meet the appropriate color and/or fashion social conventions or forecasted weather at those foreign locations.

The user establishes the clothing and/or accessories they own as a virtual closet 112 within the software application. This can be accomplished by taking pictures of each item and importing them to the device, or in the preferred embodiment through the use of a process internal to the system and device that generates virtual clothing that is similar enough to the real clothing in color, quality, and shape so as to avoid the need to have to import photos of real items. Photos of clothes can also be imported to the system, method, and device from third-party retailers that already have photos of clothing. All clothing in the virtual closet is tagged 114 with attributes that can be used to identify the clothing in useful ways. For instance, the type of weather that is associated with the garment, the layer of the garment as for instance underwear or outerwear, or any requirements associated with events that are indoor or outdoor and associated lighting difference. Given this process is likely to be time-intensive for the end user, in the preferred embodiment the attributes of garments are inferred automatically through the history of their use and through the manner in which the user utilizes the garments over time. Under conditions of limited space, such as loading baggage for a trip, the dimensions of the baggage may provide an upper bound to the number of possible objects selected, and this too can be established if desired in the preferences and constraints 108 information. Each user can choose to share his/her virtual closet with other users or choose which garments or accessories are specifically to be shared or not and with which specified users. The more information that is shared between the users, the more information that can be used by the system, methods, and device towards automatically assigning proper attributes to garments. This information is stored within the system, methods, and device and/or in connection to a cloud-computing environment. A central problem that the system, methods, and device solves for the user, is that the possible combinations of garments relative to dynamic schedules and constraints are tedious to search by hand. The system, methods, and device allow the user to explore these search spaces far more efficiently than ever before.

The user may establish a calendar 116 within the software application for the purpose of scheduling sets of clothing and accessories for current or future events. These events are entered by the user or can be automatically populated in accordance with events like national holidays, weekends vs. weekdays, and so forth. Or for instance an event could consist of a series of days linked together such as a business trip. Using the system, methods, and device, it is possible to structure clothing and accessory sets in advance for specific event types or locations.

Within the user preferences 108, the user may choose to share their entire calendar of events and associated clothing and/or accessory sets with other users or the user may set these requirements for each event as they are entered into the calendar. The calendar can also be associated with one of many types of electronic calendars often associated with hand-held phones such as Microsoft Outlook or Google Calendar to populate the calendar internal to the system, methods, and device invention here.

Information from the preferences and constraints 108, measurements 110, virtual closet 112, clothing tags 114, calendar of events 116, forecasted weather at the event location 118, event setting and lighting 120 are provided to a recommendation system 122 that associates sets of clothes and/or accessories with specific future events and provides recommendations for sets of clothes 124 back to the user. The recommendation system can be in the form of opinion from a fashion expert 126 or via a social network of users 128 or via rule-based and/or case-based expert system 130 and/or an intelligent machine learning algorithm 132 that learns over the stored history of calendar information and clothes worn by each day what the user may feel is suitable for a specific event. In the preferred embodiment the system not only uses the history of one user's fashion choices but the history of all similar users using the system, methods, and device to recommend color and/or fashion choices. The learning is also associated with feedback from the user as to which recommendations are preferred or not, or which sets worked well or not for each event on the calendar. In the preferred embodiment the recommendation system is also associated with clothing retailers and their offerings such that the user can be provided with a recommendation from the retailer or one that includes garments or accessories from a retailer with an option to buy directly from that retailer online, perhaps in advance of an event.

In the preferred embodiment, the suggested sets of clothing are available to the user using visual and/or audial and/or tactile queues 134 such that the clothes represented in the system can be understood by any user, even those visually impaired by color blindness or complete blindness. These queues could be specific to the garment, as in "red shirt," or specific to the quality of a set of clothes and accessories for a specific event, as in "this set looks great," or with a vibration of the phone representing "success." Once selected by the user as a set of clothes to wear to a specific event, that choice is automatically exported to the calendar 116 function associated with a specific date for that event. As the calendar function maintains knowledge of all future event needs and which clothes are or are not available in the user closet 112, recommendations can be provided back to the user to schedule cleaning services or offer alerts to the user 136 to ensure that the clothes for a specific set will be available in time for a specific event. Further, in the preferred embodiment the reservation of specific clothes for specific events may remove their availability for other functions at that same time. Some user events may require extended days, such as a vacation or business trip. In these cases the user can use the application to choose sets of clothes for specific meetings or purposes over that entire trip, in light of the size and weight constraints of luggage or other concerns. The device can be used to make sure that garment sets are complete prior to an event as a checklist. For recurring events, such as a weekly sporting event where the user is a player on the team, alerts may be provided to ensure that all required accessories are available and that the set is complete prior to leaving the house for the game.

Suggested sets of clothing may also be recommended in light of the specific background of interest. For example, for a formal function the user may wish to wear a set of clothing and accessories that is best in light of the background scenery at that function. The set of clothes for the function could be determined in the absence of the background information or, in the case where a photo of the background can be provided in advance, the set of clothes and accessories could be recommended that suits the specific background.

The user may also choose to select a specific first article of clothing from the virtual closet and have the system, methods, and device recommend other clothes to complete a clothes set. The user can then use the system, methods, and device to locate said other articles of clothing from their real-world closet using the camera function on the device to identify clothing with similar characteristics as those recommended by the system, methods, and device. The identification could be on the basis of matching color, shape, size, pattern, or other visual cues. This ability helps users that are visually impaired in the identification of garments that complete sets from their real closet.

In light of clothing set choices, in the preferred embodiment the user and/or the system itself then has the ability to score each set to determine to determine their suitability. Clothing sets are then ranked in order of decreasing suitability, with a user defined set of clothing sets selected to be removed. Articles of clothing in the remaining clothing sets are used to generate new clothing set choices for the user in light of the many possible combinations and constraints defined previously. The user may iterate through this process of selection and variation as a form of iterative interactive evolution. This process is repeated until a garment set of sufficient worth to the user is identified, and that set is added to the calendar for a specific function.

In the preferred embodiment the software allows for multiple users to share the information about their virtual closets and calendars of availability such that the virtual closets of all users are shared. This increases the likelihood that each user will be able to find new combinations of clothes and/or accessories that are right for his/her future events. Users can choose to share his/her clothes and/or accessories with or without a cost to other users. Additionally, the ability for multiple users to share their clothing choices offers the opportunity for users to make sure that they do or do not wear the same clothing sets to the same event as desired. The invention also allows for the opportunity for users to review and exchange clothing between their real closets using the information from the virtual closets.

Through the knowledge of which clothes in the user closet are used most often, it is possible to determine favorite garments and/or accessories and also garments and/or accessories that are hardly ever used and therefore provide an opportunity for removal from the closet either as a donation, or for sale, or for rent or loan to other users through the system. Through the system, methods, and device it is also possible for two or more users to share their profiles and virtual closets and evaluate sets of clothes and/or accessories to determine which sets look best on which users.

All data over all users in the system are stored, including the choices of garments and accessories for events, the locations of those events in terms of their geography and customs, timing, and so forth. These data are in turn used to help users make improved clothing set choices with increased efficacy and efficiency, and can also be used to help retailers understand patterns in color and/or fashion behavior over a large set of users over time. This helps retailers determine which types of apparel to offer by time, season, activity, location, and price. It is also envisioned in the preferred embodiment that retailers would pay to advertise their goods through the system, methods, and device to users who are most inclined to be interested in buying their garments and/or accessories to complete clothing sets. In another instance of the preferred embodiment, cleaning services pay access to use the system and device to determine which users are located near their service center, and which clothes they are likely to need cleaned at what times. This improves the opportunity for cleaning services to schedule and distribute their load and provide incentives to users to use their services.

In a preferred embodiment, the user opens the system, methods, and device using a software application (app) on a hand-held mobile phone 200. The user enters his/her account in the app 202, which then provides the opportunity for the user to (1) access saved outfits, which are collections of clothing articles that the user has saved on prior occasions 204, (2) view individual saved clothing items, 206 (3) enter new clothing items into a virtual closet in the app using either photos taken by the user or other graphics, 208 (4) identify other users to share clothes with or otherwise communicate with, 210 (5) assemble new outfits and receive recommended ratings of the outfits as they are being assembled 212. Other features may also be incorporated.

In a preferred embodiment when the user wants to assemble a new outfit, if the user is a man, he starts by selecting a shirt. The user selects the type of shirt, such as dress shirt, polo/casual collared shirt, or t-shirt. Based on the type of selection, the remaining types of clothes that can be selected is constrained by the system to be appropriate to the type of clothes selected already. For example, if the user selects a dress shirt, then the user cannot add a polo shirt or t-shirt to the outfit because the user already has a shirt. In addition, if the user selects a dress shirt, then the user is offered the possibility to select dress pants but not short pants.

At each point in assembling an outfit, which in a preferred embodiment consists of at least a selected shirt and selected pants, the system provides ratings for how well the articles of clothes go together 214. These ratings can be provided based on (1) expert opinion, (2) the opinions of other users (3) a rule-based or case-based expert system, and/or (4) machine learning. In the case of providing an expert opinion, the opinion of an expert on how well the clothes go together may be preloaded in the app or may be generated in real-time based on an immediate expert response from someone knowledgeable about color matching and/or fashion choices. The same is true when considering the opinions of other users, which may be given in real-time or at a later time.

In the case of a rule-based or case-based expert system, in a preferred embodiment, the app uses a set of decision trees to determine the rating for each next article of clothing based on the articles already selected. Ratings are provided on a scale, such as a star scale, with 1 star being low and 5 stars being high or vice versa. The ratings are determined based on how well the colors and/or styles of the clothes complement each other, as well potentially by the date, time, and place that they are expected to be worn based on the user's entry in a calendar. The decision trees in the app can be updated over time by a system administrator 216 who retains authority to modify the app for any or all users.

In the case of machine learning, in a preferred embodiment the app uses machine learning techniques, which may include a combination of neural networks or deep learning (neural networks with more than one hidden layer), evolutionary algorithms, reinforcement learning, support vector machines, random forest methods, swarm optimization, fuzzy logic, and other techniques. The machine learning methods 300 use data on what the user has liked previously 302, based on what the user has saved as preferred outfits 304, in order to generalize on what the user will like in the future 306. Features about the clothing articles serve to assist in the generalization 308. These features may include color, texture, type of article, time since last worn, patterns in the clothing, and other items. The machine learning methods may also generalize from data from people who are not the current user 310, by associating similar people with similar fashion sense to the user and imputing that what those people like will be similar to what the current user likes. The machine learning methods may use a numeric rating 312 or also word-based descriptions of how well articles of clothing go together rather than numeric ratings 314. For example, when using fuzzy logic, the app may offer that a particular pair of pants goes with a shirt "pretty well" or "poorly." The machine learning algorithms may also adjust the ratings of clothes that are believed to go well together based on feedback from the user and/or other users 316, taking into account fashion/color trends as well as geographic and social dynamics.

In a preferred embodiment, the machine learning methods may also be used to make suggestions to a user as to what to include in their virtual closet based on data provided by retailers and/or other users of the app 318. The machine learning methods accept data on current sales trends of different articles of clothing to users 320 that are generalized to be similar to the current user and constructs a mathematical model 322 that results in suggesting which new articles of clothes the current user should acquire. This could be for the purpose of completing an existing outfit, such as having the app suggest that a particular tie would aptly complement a particular shirt, pants, belt, socks, and shoes already saved by the user as an outfit. It could also be for the purpose of suggesting new outfits or individual articles of clothing to the user not based on what the user already has in his/her virtual closet.

In a preferred embodiment, the app allows for users to contact other users to communicate 400 and identify items of clothing that could be shared, borrowed, or sold from one user to another 402. The app provides for a user to view another user's virtual closet 404, with permission, and to identify articles of clothing that would be desired. The app also allows for a user to identify which articles of clothing would be available for other users 406.

In a preferred embodiment, the app also provides for collecting data regarding the use of different articles of clothing 500, the purchasing habits of users 502, and associated demographic information 504, which can be provided to clothing retailers and manufacturers 506 so as to improve their business performance. Machine learning methods can also be used on these data to provide business insights to retailers and manufacturers.

In a preferred embodiment, the user takes photos and/or video of clothing items 600 from his/her closet and uses these photos to build a virtual closet 602. To do this, the app relies on wireframes and/or images of articles of clothing that the user can identify 604. The photo is then mapped to the wireframe, providing an easy method of presenting a particular item to the user for future use. As the light that is available for taking a photo of a clothing article is not anticipated to be the same for all users at all times, after the user takes a photo of an article of clothing, the photo is presented to the user to confirm that it appears suitable 606. In addition, the user can touch a spot on the photo that best represents the color of the article of clothing. This color is retained by the app in terms of its red-green-blue (RGB) values. These values can then be adjusted based on available information about lighting that was used to take the photo.

In a preferred embodiment one of several processes are used to increase the rate that articles of clothing can be imported into a virtual closet. In a standard approach as described in the parent patent, a user takes individual photos of each individual article of clothing in the wardrobe and then imports these into a virtual closet. In another approach, a user arranges articles of clothing from a wardrobe as an outfit and takes one photo of a complete outfit for purpose of input to the virtual closet and/or scoring. In another approach, a user takes one photo of an entire wardrobe and uses a process of machine learning to automatically identify and label the types of clothing in the wardrobe. This process can be thought of as the instantaneous capturing of all possible outfits through one photo. In a final approach, a user can take video of the articles of clothing in their wardrobe as a "bulk import" and then divide the video content into useful frames of interest focused on articles of clothing as a separate second step.

In the above method focused on the capture of an entire wardrobe through one photo, there are of course many issues to contend with such as the appropriate identification of articles of clothing while viewing the article of clothing largely from the side as it hangs on a hangar. Further, in any user's wardrobe it is not always the case that clothing are grouped nicely by type. Typically, when someone takes a photo of an article of clothing to store in a virtual closet within a smartphone app, the article of clothing is either worn or is placed on another surface, such as a bed. To address the case where multiple items are photographed at once, here we first consider the situation of taking a photo of a person wearing clothes, such as a photo taken in a mirror, or having the items placed on a bed. This leads to a problem of classifying objects relative to the background of the color of that bed.

Various approaches exist in the literature for the clustering of parts of an image based on contrast relative to a background (Chen et al., 2019; Jaiswal et al., 2019; Watkins and van Niekerk, 2019). Additionally there are proven edge-detection functions in the literature often incorporating extended Sobel methods, Canny, Prewitt, Roberts and other methods (including fuzzy logic) (see Vincent and Folorunso, 2009). Here we modify these for the automatic detection of articles of clothing from one image such that a virtual closet can be populated rapidly, along with information about the type of clothing being added to the virtual closet.

Convolutional neural networks (CNNs) are well suited to such problems. As extensions of multilayer perceptrons (fully-connected neural networks), CNNs were inspired by the organization of the visual cortex. Input neurons respond to stimuli in segmented regions of the visual field. This can be replicated in software where different areas of an image are processed by small parts of a larger neural network, which provides subsequent processing to arrive at a characterization of the image (or the data presented if not from an image).

Given a corpus of training examples (e.g., different combinations of articles of clothing in different wardrobes) it is possible to train and test CNNs to detect the location of articles of clothing in images. Given a corpus of training examples (e.g., different articles of clothing assigned by their type in wardrobe settings) it is possible to train and test CNNs to classify clothing by type. For instance Bhatnagar et al. (2017) studied the use of CNNs on the Fashion-MNIST database of fashion items (see Xiao et al.) classified into 10 categories. Classification accuracy reached approximately 92% in test sets; however, the images in the database are much easier than in real-world conditions. While Fashion-MNIST was an important contribution to the general problem of classifying fashion images, the dataset is entirely greyscale with each article of clothing laid out perfectly, not arranged as found typically in a closet. Liu et al. (2016) assembled a color database of articles of clothing on individuals with 120,000 images and studied the use of a cascade of CNNs to identify positions of functional key points defined on the fashion items, such as the corners of neckline, hemline, and cuff. The objective was to recall stored images from limited information. This line of research was an important contribution in a new direction, even though the result showed that images could be retrieved at best about 60% of the time using key locations on specific garments.

A preferred embodiment for this approach makes use of machine learning approaches such as CNNs or evolved neural networks to automatically detect articles of clothing in a single wardrobe photo and automatically assign each article of clothing to a type and/or color for purpose of rapid addition to a virtual closet.

In a separate method for bulk import through video capture, there are other issues to contend with that are different from simple photography. For instance, the camera or smartphone must be pointed at a wardrobe while the user exposes each article of clothing hanging in the wardrobe in an orientation and lighting appropriate to the camera such that a majority of each article of clothing is in clear view during the video. Following this data capture of part of or an entire wardrobe by a user, the completed video is further annotated by one or more additional methods as described below.

Method 1 annotates the video using human intelligence (e.g., a process such as Mechanical Turk) whereby each clothing item is timestamped. The time stamp information of the video is used to train systems to identify a frame for each clothing item. Method 2 annotates the video using machine intelligence to recognize when a clothing item is displayed relative to the motion of items or other elements in the video. For instance, as the user will be moving from one item to the next in the wardrobe, a machine learning approach recognizes that time stamp in the video with less motion likely represent articles of clothing to be categorized. Either of these approaches results in a model that is trained to recognize the timing of articles of clothing in a video stream. Once such a model has been developed a user-collected video can be run through the model where the output of the model provides the time and still frame for each article of clothing in the video.

This rapid categorizing of articles of clothing and their associated still frames abstracted via video capture generates an output that is suitable as input to other downstream models for background segmentation, identification of articles of clothing by type (e.g., pants vs. shirts), identification of clothing categories (e.g., formal, work, leisure), identification of clothing features (e.g., pocket vs. no pocket), identification of patterns of interest (e.g., plaid, striped), identification of texture (e.g., smooth, rough). The importance of the above video capture approach is in the time savings generated through the bulk import of articles of clothes from a user wardrobe.

As similar to our preferred embodiment for individual photo analysis, CNNs are used to determine the type and categorization of the garment in each frame. The success of CNNs across a wide range of other examples of video-event detection/classification provides a foundation for applying similar technology to the problem of detecting and classifying clothing from a video. The technical approach for video processing relies on determining when the image is paused, finding the edges of the article of clothing through a process of edge detection, and then proceeding analogously to classifying a clothing item as if it were taken as a still photo. Therefore, the identification and assignment of garment type or set of garments uses at least one computational approach including, but not limited to, background segmentation, generation of still frames, video-event detection or edge detection using machine learning in order to assist the individual with the task of selecting a preferred matching set of garments.

In a preferred embodiment, the user takes photos of clothing items 600 from his/her closet and uses these photos to build a virtual closet 602. To do this, the app relies on wireframes of articles of clothing that the user can identify 604. The photo is then mapped to the wireframe, providing an easy method of presenting a particular item to the user for future use. As the light that is available for taking a photo of a clothing article is not anticipated to be the same for all users at all times, after the user takes a photo of an article of clothing, the photo is presented to the user to confirm that it appears suitable 606. In addition, the user can touch a spot on the photo that best represents the color of the article of clothing. This color is retained by the app in terms of its red-green-blue (RGB) values. These values can then be adjusted based on available information about lighting that was used to take the photo.

In a preferred embodiment, one method for making this adjustment relies on using a light meter to determine the luminosity in the area 608. Based on the luminosity as compared to a standard reference luminosity, the RGB values area adjusted up or down as appropriate to approximate what the RGB values would be had the photo been taken under a standard reference luminosity.

In a preferred embodiment, another method for making this adjustment relies on having the user take a photo under their current light of a reference material of a known color, such as a white piece of paper 610. The resulting RGB values are then compared to the known RGB values of the reference material, such as 255-255-255 for white. The app then makes adjustments to increase or decrease the RGB values as appropriate based on how much discrepancy there was between the identified RGB values and known reference values.

It is recognized that the human eye can differentiate over 10 million colors; however, it would be impractical for a system, methods, and device in this application area to identify articles of clothing based on 10 million colors. People are used to identifying colors based on a very small subset of all possible colors, and retailers often use a standard subset of clothes that are known by their color such as "khaki" pants. In a preferred embodiment, a method is used to map various colors 700 to more commonly known colors 702 that are representative of the color being viewed. A set of colors, such as red, orange, yellow, light green, dark green, light brown, dark brown, khaki, charcoal, light grey, black, white, ivory, light blue, navy blue, royal blue, light pink, dark pink, purple, lavender, and gold, that provides an intuitive spectrum of possible colors may be used. Colors are mapped to the colors in the selected set based on a distance measure, such as Euclidean distance in RGB space, and the closest color in the selected set is chosen as the representative color label to identify the color of the article of clothing to the user.

In a preferred embodiment, the user may also decide to add labels for colors that are of interest 704. For example, if the provided set of labeled colors includes orange, but no other variations of orange, and the user has a variety of orange-colored shirts, he may wish to add labels for colors such as tangerine, rust, or pumpkin. This may be done by inputting the RGB values associated with the color label, which are generally available from many sources.

In a preferred embodiment, users 800 share their virtual closets 802 with garment cleaning companies 804 when dropping off their garments for cleaning. Given garment cleaners often already tag individual garments with barcodes and hand enter data about each garment through a point-of-sale software system, as garments are entered into the garment cleaner system, the data can be used to automatically populate the user's virtual closet with garments 806 as a service. Given it is the case that not all humans visualize colors in the same way, this data entry can include errors based on the variance of human perception and the subjectivity of color assignment. The methods of the present invention avoid these pitfalls by standardizing the color labeling on the basis of objective, repeatable elements such as RGB values or the assignment of RGB values to color names. The preferred method also enhances the ability of garment cleaning companies to hire employees with disabilities through improved automation. Through our method the data entry may also be accomplished through bulk import 808 of a single user's garments to speed up the process to help, for example, a dry cleaner keep track of these garments while in their care. In this respect, the third-party entity's virtual closet 810 contains garments from a variety of users and where these garments come and go from the third-party entity's virtual closet with time. Once garments are in the system, the garment cleaner can use the method for garment tracking 812 through the cleaning process from start to finish while sending outbound user notifications 814 regarding the status of the process and when each garment or collection of garments is ready for pickup. From the user's perspective, garments that are at the garment cleaners still appear in the individual user's virtual closet but with a label that indicates their status in the garment cleaning process.

Users can choose to make their personal calendars 816 available to the garment cleaner. In this embodiment, for example, a dry cleaner learns when to expect to receive user garments after a trip or when to provide cleaned garments back to the customer in time for a subsequent trip. The method also allows garment cleaners to appropriate time discounts or other marketing offers to customers relative to their calendar or known history of travel or previous history of garment cleaning. The method can also allow garment cleaners to improve their understanding of possible service offerings including on-demand pickup of garments or drop-off facilities that improve access to garment cleaning services.

As a part of the present invention, dry cleaners can monitor the deterioration of garments 818 and number of wash cycles on a per-garment basis, adding this information back to the closet for each individual user. This information will help the users forecast when it is time to either repair or replace a garment of specific type and understand how often specific garments are used and cleaned. Garments that are aging and yet routine use by a user are strong candidates for replacement, and links can be provided directly to a user that connects the user with a retailer with similar item for sale thus helping to reduce the time required for users to find replacement garments and helping direct customers to retailers.

A preferred embodiment utilizes garment cleaners and their information across multiple user virtual closets 820 as a hub for the renting or sharing of garments 822 between customers. For instance, if user A has a jacket that is now ready for pickup, user is A alerted by a dry cleaner. User A can choose to also make the jacket available for rent. In this case, the dry cleaner can make the jacket available in the virtual closets of other users of the system. If User B wishes to rent User A's jacket, this can be accomplished through the dry cleaner, with User B picking up the jacket for use with payment either directly to User A or payment to the dry cleaner on behalf of User A. When rented, that garment appears as "rented" in User A's virtual closet until such time as User B has completed their use. When User B has completed use, User B returns the rented garment to the same dry cleaner for cleaning after which User A is alerted again that the garment is available for pickup or rent. This process is repeated until User A collects the garment physically from the dry cleaner or until the dry cleaner requests that User A does so or pays a fee for storage with the dry cleaner. Throughout the process of rental, the virtual closets of both User A and User B are updated with regards to the status of the jacket 824. This process can be repeated for any garment or accessory suitable for dry cleaning irrespective of the age or gender of either user. Note that the standardization of colors across all garments and across all user virtual closets means that when User B expects to receive a jacket of a specific color from User A, the jacket will indeed be that color and not some variation based on the subjective color assignment of either User A or User B, one or both of whom might have issues with color perception such as those with color blindness. Use of our method eliminates this subjectivity and ensures that all colors across all virtual closets are represented in a standardized way.

The method allows for the information regarding the entire set of garments being processed through a garment cleaning store over time to be examined for trends regarding the garment age, producer, size, color, pattern, or other characteristics. For example, such trend analysis 826 is useful for dry cleaning stores to better understand the nature of their customers, for load and schedule balancing, and for possible discounts back to specific users and specific times to improve revenue. Such information is also licensed back to retailers to provide new insights across broad geographic regions and across garment retailers helping drive new product decisions and providing direct access to users through their virtual closets. Users can opt in to have retailers connect with them directly regarding product offerings or reduced pricing on garments in light of the user's garments, virtual closet, and cleaning trends.

Given point of sale systems are key in the garment cleaning industry, the method can be connected directly to point of sale systems to further improve quality of customer experience and business efficiency or the method can be on an individual basis on each user's smart phone.

It is to be expected that the description of the preferred embodiment is not a limitation on variations or extensions of the invention. For example, it may be desirable to allow a male user to create an outfit starting with an article of clothing other than a shirt.

This invention described here is useful for optimizing color or fashion decisions for people with or without visual impairment. The invention couples human expertise of many different types and the user's collection of garments and accessories to recommend clothing sets that are appropriate in light of work, season, weather, or other environment requirements. Using the system and device the user then uses a process of iterative evolution to arrive at garment sets that are best for future events and in light of many constraints.

It will be appreciated that details of the foregoing embodiments, given for purposes of illustration, are not to be construed as limiting the scope of this invention. Although several embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

The invention claimed is:

1. A method for assisting an individual with the task of selecting a preferred matching set of garments to assemble an outfit for the individual, the method comprising: providing a data storage system for storing digital renditions of garments; providing a portable communication device to extract color and/or pattern from garments through use of a camera and at least one algorithm; providing a processor capable of accessing locally stored and/or remote information about or learning the preferred matching set of garments; assigning each garment in the set of garments a red-green-blue (RGB) value; providing a suitability ranking for matching compatibility of the garment or the set of garments; and providing recommendations for preferred matching garment or set of garments by organizing the garments in at least one queue selected from the group consisting of audial, tactile, visual or a combination thereof, wherein the individual can touch a spot on the digital renditions of the garments or accessories to determine its RGB value, further wherein the RGB value associated with a particular garment or accessory is mapped to exemplar RGB values associated with specified colors, wherein the individual imports garments or set of garments, through a series of photos or video, for bulk import into a virtual closet for the identification and assignment of type of garments or set of garments using human or computational methods, wherein the virtual closet is accessed by a third-party entity.

2. The method of claim 1 where quality associated with matching of clothing is represented to the individual through audio feedback in the form of a tone or voice.

3. The method of claim 1 where quality associated with matching of clothing is represented to the individual through vibration or tactile sensation.

4. The method of claim 1 where quality associated with matching of clothing is represented to the individual numerically.

5. The method of claim 1 where quality associated with matching of clothing is represented to the individual using language.

6. The method of claim 1 where the individual creates a new label for a color and assigns the RGB value.

7. The method of claim 1 where the individual iteratively touches a photo of their garment to find the RGB value that is most representative of the garment.

8. The method of claim 1 where the individual swipes or touches in multiple places across the photo of their garment to determine an average RGB color.

9. The method of claim 1 where the individual swipes or touches in multiple places across the photo of their garment to identify that the garment can be represented by multiple colors.

10. The method of claim 1 where an adjustment is performed by taking a photo of a known reference color and modifying RGB values of future photos by a normalization factor that accounts for the difference between the RGB value of the known reference color and the RGB value realized by the photo.

11. The method of claim 1 where an adjustment is performed using a reference level of luminosity and modifying RGB values of future photos by a normalization factor that accounts for the recorded luminosity.

12. The method of claim 1 wherein a calendar of previous, current, and future events and their associated fashion requirements is presented to the individual.

13. The method of claim 12 wherein the calendar maintains a history of clothes worn on previous dates, clothes currently available or unavailable for use, and allows the individual to associate clothes or sets of clothes with future events or to schedule cleaning services such that the clothes are available in time for specific events.

14. The method of claim 12 wherein the individual adjusts any parameters associated with their preferences and requirements for current and future events.

15. The method of claim 14 wherein the parameters are stored as data for all individuals using the system.

16. The method of claim 14 wherein the parameters are inferred automatically through their history of use.

17. The method of claim 14 wherein the parameters are inferred from data on how the individual utilizes the garments over time.

18. The method of claim 17 wherein the use of garments over time is inferred through the set of garments in the third-party entity or across multiple third-party entities to determine how individuals utilize garments over time.

19. The method of claim 1 wherein the algorithm is a case-based procedure.

20. The method of claim 1 wherein data are collected from a social network of individuals.

21. The method of claim 20 wherein the social network is used for the sharing or renting of clothes between individuals.

22. The method of claim 21 wherein the third-party entity is used to assist in the sharing or renting of clothes between individuals.

23. The method of claim 20 wherein the social network can be used to evaluate garments or sets of garments for their quality or utility towards future clothing selections.

24. The method of claim 1 wherein the individual is visually impaired and is affected either by blindness, partial blindness, or color blindness.

25. The method of claim 1 wherein the garments or set of garments are prearranged by type, features, patterns, colors, or use as an outfit prior to bulk import.

26. The method of claim 25 wherein the garments or set of garments are prearranged by type, features, patterns, colors, or use as an outfit at the third-party entity prior to bulk import.

27. The method of claim 1 wherein the bulk importing of garments or sets of garments to a virtual closet is achieved using photography or video.

28. The method of claim 27 wherein the bulk importing of garments or sets of garments to an individual virtual closet is achieved by the third-party entity.

29. The method of claim 28 wherein the colors of all garments are standardized according to RGB values and specified colors.

30. The method of claim 1 wherein the identification and assignment of type and/or color for garments or set of garments using human methods further comprises a time stamp of the appearance of separate garments in a video.

31. The method of claim 1 wherein the identification and assignment of type of garments or set of garments uses a computational approach selected from the group consisting of background segmentation, generation of still frames, video-event detection and edge detection using machine learning.

32. The method of claim 1 wherein the third-party entity is a garment cleaning company.

33. The method of claim 32 wherein the garment cleaning company interacts with user calendars to provide updates on garment status relative to scheduled trips or events.

34. The method of claim 1 wherein the third-party entity uses its own virtual closet to represent all of the garments being cleaned at their facility across multiple individual customers.

35. The method of claim 34 wherein the virtual closet of the third-party entity is connected directly to the virtual closets of individuals either through a portable communication device or point of sale system.

36. The method of claim 35 wherein the third-party entity communicates about status of garments in their care with garment owners through the portable communication device or point of sale system.

37. The method of claim 1 wherein the third-party entity uses the method to track the garments in their care over time.

38. The method of claim 37 wherein status of garments includes the use and deterioration of each garment.

* * * * *